US011915166B2

(12) United States Patent
Littlejohn et al.

(10) Patent No.: US 11,915,166 B2

(45) **Date of Patent: *Feb. 27, 2024**

(54) METHOD FOR FACILITATING NETWORK EXTERNAL COMPUTING ASSISTANCE

(71) Applicant: RISC Networks, LLC, Asheville, NC (US)

(72) Inventors: Jeremy Lynn Littlejohn, Fairview, NC (US); Gregory Evan Watts, Nottingham, NH (US)

(73) Assignee: RISC Networks, LLC, Asheville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/443,008

(22) Filed: Jul. 19, 2021

(65) Prior Publication Data

US 2022/0083928 A1 Mar. 17, 2022

Related U.S. Application Data

(63) Continuation of application No. 16/232,420, filed on Dec. 26, 2018, now Pat. No. 11,068,809, which is a (Continued)

(51) Int. Cl.
*G06Q 10/0631* (2023.01)
*H04L 67/10* (2022.01)
(Continued)

(52) U.S. Cl.
CPC ......... *G06Q 10/0631* (2013.01); *H04L 67/10* (2013.01); *H04L 67/1097* (2013.01); *H04L 67/60* (2022.05); *H04L 67/75* (2022.05)

(58) Field of Classification Search
None
See application file for complete search history.

(56) References Cited

U.S. PATENT DOCUMENTS 7,664,712 B1 * 2/2010 Duvall ..................... G06N 5/02 707/758
7,711,751 B2 5/2010 Kelley et al.
(Continued)

FOREIGN PATENT DOCUMENTS

WO WO-2011067099 6/2011
WO WO-2011067099 A2 * 6/2011 .......... G06F 9/5072
(Continued)

OTHER PUBLICATIONS

Gui, Z., et al. "A Service Brokering and Recommendation Mechanism for Better Selecting Cloud Services." (2014). (Year: 2014).*
(Continued)

*Primary Examiner* — Timothy Padot
*Assistant Examiner* — Derick J Holzmacher
(74) *Attorney, Agent, or Firm* — Knobbe, Martens, Olson & Bear, LLP

(57) ABSTRACT

There is provided a method for providing pricing information about a potential migration of a network computing task. The method includes the step of providing a provider availability set, identifying a price qualified set for each cloud service provider, and displaying the information about each cloud service provider and its pricing via a user interface. The price qualified set includes each cloud service provider: (a) whose price for performing the task complies with a price acceptability criteria or (b) that has a respective price proposal associated therewith reflecting a price for engaging the cloud service provider to perform the task in lieu of the task being performed by the network.

18 Claims, 9 Drawing Sheets

Related U.S. Application Data continuation of application No. 15/968,257, filed on May 1, 2018, now abandoned, which is a continuation of application No. 15/716,929, filed on Sep. 27, 2017, now abandoned, which is a continuation of application No. 14/146,466, filed on Jan. 2, 2014, now abandoned.

(51) Int. Cl.
*H04L 67/1097* (2022.01)
*H04L 67/60* (2022.01)
*H04L 67/75* (2022.01)

(56) References Cited

U.S. PATENT DOCUMENTS 8,484,355 B1* 7/2013 Lochhead ............. G06F 9/5077 709/222
8,667,138 B2* 3/2014 Ganesan ............... G06F 9/5072 709/224
8,745,233 B2* 6/2014 Bartfai-Walcott .... G06F 9/4856 718/1
8,751,627 B2 6/2014 Liu et al.
8,775,629 B1 7/2014 Whittle
9,294,236 B1* 3/2016 Ward, Jr. ........... G06Q 30/0645
9,608,931 B2* 3/2017 Sharma ................. G06F 9/4856
9,985,847 B2 5/2018 Tung
2004/0114580 A1 6/2004 Santry et al.
2006/0092861 A1 5/2006 Corday et al.
2008/0080396 A1* 4/2008 Meijer .................... H04L 12/66 370/254
2008/0080522 A1 4/2008 Gates
2008/0080552 A1* 4/2008 Gates ...................... H04L 12/66 370/468
2009/0119256 A1 5/2009 Waters et al.
2009/0222540 A1 9/2009 Mishra et al.
2009/0276526 A1 11/2009 Carlson et al.
2009/0276771 A1* 11/2009 Nickolov ............... G06Q 30/04 718/1
2010/0100778 A1 4/2010 Sullivan
2010/0125669 A1* 5/2010 Esfahany .............. G06F 9/5072 709/228
2010/0131592 A1 5/2010 Zhang et al.
2010/0250642 A1* 9/2010 Yellin ................. G06F 11/3409 709/224
2010/0287263 A1 11/2010 Liu et al.
2010/0319004 A1* 12/2010 Hudson ................. G06F 9/5072 719/328
2010/0332401 A1* 12/2010 Prahlad ............... G06F 16/1844 711/E12.001
2010/0332615 A1 12/2010 Short et al.
2011/0107327 A1 5/2011 Barkie et al.
2011/0107398 A1* 5/2011 Earl .......................... H04L 9/32 726/3
2011/0131335 A1* 6/2011 Spaltro ................... H04L 67/02 709/228
2011/0145094 A1* 6/2011 Dawson ................. G06Q 30/06 707/E17.014
2011/0246376 A1 10/2011 Devakondra et al.
2011/0252420 A1 10/2011 Tung
2011/0295999 A1* 12/2011 Ferris ...................... H04L 47/83 709/224
2012/0016721 A1* 1/2012 Weinman ............... G06Q 30/02 705/7.35
2012/0060142 A1* 3/2012 Fliess .................. G06F 11/3457 717/102
2012/0096149 A1* 4/2012 Sunkara ................ G06F 9/5072 709/224
2012/0109844 A1 5/2012 Devarakonda et al.
2012/0131591 A1* 5/2012 Moorthi ................ G06F 9/5061 718/104
2012/0185848 A1* 7/2012 Devarakonda ...... G06F 9/45533 718/1
2012/0198073 A1* 8/2012 Srikanth ................. H04L 67/10 709/226
2012/0304179 A1 11/2012 Devarakonda et al.
2013/0060933 A1* 3/2013 Tung ................... H04L 41/5003 709/224
2013/0067090 A1* 3/2013 Batrouni ............. H04L 67/1097 709/226
2013/0073614 A1 3/2013 Shine
2013/0091212 A1 4/2013 Rajakarunanayake
2013/0117157 A1* 5/2013 Iyoob ..................... G06Q 30/06 705/26.41
2013/0174168 A1* 7/2013 Abuelsaad ....... G06Q 10/06315 718/102
2013/0227113 A1 8/2013 Baras et al.
2013/0232254 A1* 9/2013 Srikanth ................. H04L 43/06 709/224
2013/0246623 A1* 9/2013 Seth ...................... H04L 47/783 709/226
2013/0275574 A1 10/2013 Hugard, IV et al.
2013/0297560 A1* 11/2013 Becker .................... G06F 16/23 707/609
2013/0297802 A1* 11/2013 Laribi ................. H04L 12/6418 709/226
2013/0346227 A1* 12/2013 Jain ........................ G06Q 30/08 705/400
2013/0346619 A1* 12/2013 Panuganty .............. H04L 41/12 709/226
2014/0040711 A1* 2/2014 Brownlow .......... G06F 16/9577 715/202
2014/0122702 A1 5/2014 Jung et al.
2014/0123135 A1* 5/2014 Huang ................ H04L 41/5054 718/1
2014/0143293 A1* 5/2014 D'Urso ................... H04L 67/34 709/201
2014/0149494 A1 5/2014 Markley et al.
2014/0229944 A1 8/2014 Wang et al.
2014/0278808 A1* 9/2014 Iyoob ................ G06Q 30/0206 705/7.35
2014/0280848 A1 9/2014 Modh et al.
2014/0298091 A1 10/2014 Carlen et al.
2014/0301192 A1 10/2014 Lee et al.
2014/0337429 A1 11/2014 Asenjo et al.
2014/0365662 A1* 12/2014 Dave .................. H04L 41/0893 709/226
2015/0043378 A1 2/2015 Bardgett et al.
2015/0127806 A1 5/2015 Zizlavsky et al.
2015/0156065 A1* 6/2015 Grandhe ............... H04L 67/562 709/224
2015/0188919 A1 7/2015 Belton, Jr. et al.
2015/0195182 A1 7/2015 Mathur et al.
2015/0222723 A1* 8/2015 Adapalli .............. G06Q 10/067 705/26.41
2015/0277856 A1 10/2015 Payne et al.
2015/0341230 A1* 11/2015 Dave ...................... G06Q 30/02 705/7.29
2016/0019636 A1* 1/2016 Adapalli ................. H04L 67/10 705/26.81
2017/0116626 A1 4/2017 Ramamoorthy et al.
2018/0025399 A1 1/2018 Nedeltchev et al.
2018/0089290 A1 3/2018 Haggie et al.

FOREIGN PATENT DOCUMENTS

WO WO-2012027478 3/2012
WO WO-2012027478 A1 * 3/2012 ........... G06F 9/5061
WO WO-2012102863 A2 * 8/2012 ........... G06F 16/658
WO WO-2012102863 A2 8/2012
WO WO-2013112833 A2 * 8/2013 ........... G06F 9/5061
WO WO-2013112833 A2 8/2013
WO WO-2013192059 A2 * 12/2013 ............ G06Q 30/08
WO WO-2013192059 A2 12/2013

OTHER PUBLICATIONS

Qu, Chenhao, and Rajkumar Buyya. "A cloud trust evaluation system using hierarchical fuzzy inference system for service selec-

(56) References Cited

OTHER PUBLICATIONS tion." 2014 IEEE 28th International Conference on Advanced Information Networking and Applications. IEEE, 2014. (Year: 2014).*

Aversa, Rocco, Nicola Panza, and Luca Tasquier. "An agent-based platform for cloud applications performance monitoring." 2015 Ninth International Conference on Complex, Intelligent, and Software Intensive Systems. IEEE, 2015. (Year: 2015).*

Arfeen, M. Asad, Krzysztof Pawlikowski, and Andreas Willig. "A framework for resource allocation strategies in cloud computing environment." 2011 IEEE 35th Annual Computer Software and Applications Conference Workshops. IEEE, 2011. (Year: 2011).*

Massonet, Philippe, et al. "A monitoring and audit logging architecture for data location compliance in federated cloud infrastructures." 2011 IEEE international symposium on parallel and distributed processing workshops and PhD forum. IEEE, 2011. (Year: 2011).*

Babar, Muhammad Ali, and Muhammad Aufeef Chauhan. "A tale of migration to cloud computing for sharing experiences and observations." Proceedings of the 2nd international workshop on software engineering for cloud computing. 2011. (Year: 2011).*

Khajeh-Hosseini, Ali, David Greenwood, and Ian Sommerville. "Cloud migration: A case study of migrating an enterprise it system to iaas." 2010 IEEE 3rd International Conference on cloud computing. IEEE, 2010. (Year: 2010).*

Goscinski, Andrzej, and Michael Brock. "Toward dynamic and attribute based publication, discovery and selection for cloud computing." Future generation computer systems 26.7 (2010): 947-970. (Year: 2010).*

Breitbart, et al., "A Topology discovery in heterogeneous IP networks: the NetInventory system," IEEE/ACM Transactions on Networking (TON), Jun. 1, 2004;12(3):401-14.

Gui, Z., et al. "A Service Brokering and Recommendation Mechanism for Better Selecting Cloud Services." (2014).

Goscinski, A et al. "Toward dynamic and attribute based publication, discovery and selection for cloud computing." Future generation computer systems 26.7 (2010): 947-970. (Year: 2010).

Qu, C. et al. "A cloud trust evaluation system using hierarchical fuzzy inference system for service selection." 2014 IEEE 28th International Conference on Advanced Information Networking and Applications. IEEE, 2014. (Year: 2014).

Aversa, R. et al. "An agent-based platform for cloud applications performance monitoring." 2015 Ninth International Conference on Complex, Intelligent, and Software Intensive Systems. IEEE, 2015. (Year: 2015).

* cited by examiner

METHOD FOR FACILITATING NETWORK EXTERNAL COMPUTING ASSISTANCE

CROSS-REFERENCE TO RELATED APPLICATIONS

This application is a continuation of U.S. patent application Ser. No. 16/232,420, filed Dec. 26, 2018, which is a continuation of U.S. patent application Ser. No. 15/968,257, filed May 1, 2018, which is a continuation of U.S. patent application Ser. No. 15/716,929, filed Sep. 27, 2017, which is a continuation of U.S. patent application Ser. No. 14/146,466, filed Jan. 2, 2014, the entire contents of each of which are incorporated by reference herein and made part of this specification.

BACKGROUND OF THE INVENTION

US Published Patent Application No. 2011/0246376 to Devakondra et al. points out that network data processing systems are used for a variety of different purposes and come in a number of different forms. Several types of network data processing systems are commonly used by companies and other organizations and may include, for example, local area networks, wide area networks, virtual private networks, and other suitable types of networks.

In addition to such networks that may be maintained by the network operator itself, cloud services are available and the users of this type of network data processing systems neither own nor manage the physical infrastructure. In this manner, users may avoid capital expenditures, support costs, maintenance costs, labor costs, and other costs associated with more traditional types of networks. With cloud-based network environments, users consume resources as a service and typically pay based on the use of those resources. By turning to cloud-based computing resources, companies and organizations can avoid capital expenditures, such as costs for hardware, software, information technology services, and other associated costs.

Clouds may include, for example, a public cloud, and a hybrid cloud. A public cloud is a network environment in which users access computing resources over a network, such as the internet. A private cloud is an internal cloud in which resources are accessed on private networks, such as an intranet. A private cloud also may provide additional separation from other users. A private cloud may include firewalls and other devices to provide for increased security and separation.

Organizations that employ more traditional types of network data processing systems may contemplate whether to change over from their more traditional network environment to a cloud network environment. In view of the fact that the particular cloud services offered by each cloud service provider or vendor will have different features, benefits, service operating requirements, and costs, it would be advantageous for a network operator to have access to tools that can help guide a decision to migrate computing tasks to a cloud. Moreover, it would be advantageous if such tools for a guiding a network operator could equip the network operator to have an accurate picture of the computing resources in its own network that will or can be replaced by the cloud computing resources. Furthermore, network operators can make better informed decisions about purchasing cloud services if they can get pricing information about potential cloud service providers and, especially, pricing information about the scope of computing resources that tasks could be taken over in a cloud service arrangement.

SUMMARY OF THE INVENTION

One object of the present invention is to provide a method for facilitating network external computing assistance that is particularly useful for providing pricing information about a potential migration of a network computing task. The method includes the step of providing a provider availability set, identifying a price qualified set for each cloud service provider, and displaying the information about each cloud service provider and its pricing via a user interface. The provider availability set includes those cloud service providers who are deemed capable of performing the network computing task in lieu of the task being performed by the network. The price qualified set includes each cloud service provider: (a) whose price for performing the task complies with a price acceptability criteria or (b) that has a respective price proposal associated therewith reflecting a price for engaging the cloud service provide to perform the task in lieu of the task being performed by the network.

Another object of the present invention is to provide a method for providing information about a network, the network being operable to perform a resolution flexible task which is a task that could be performed via a given set of assets of the network or that could alternatively be performed via an alternative task performer external to the network. The method includes the step of providing an availability set each member of which is an alternative task performer deemed capable of performing a resolution flexible task in lieu of the task being performed by the network. The method also includes the step of identifying, with respect to those alternative task performers in the availability set, a price qualified set each member of which is an alternative task performer (a) whose price for performing the task complies with a task acceptability criteria or (b) that has a respective price proposal associated therewith reflecting a price for engaging the alternative task performed to perform the task in lieu of the task being performed by the network. The step of identifying a price qualified set includes evaluating selected operational relationships between assets of the network to determine the scope and extent of computing services that would need to be provided by each cloud service provider in the availability set in the event that the respective cloud service provider were to perform the network computing task in lieu of the ask being performed by the network. The method further includes the step of at least one of communicating information via a user interface about the price qualified set or initiating the performance of the task by an alternative task performed in the price qualified set.

A further object of the present invention is to provide a tangible computer-readable medium for storing instructions for controlling a computing device to generating an output, the instructions controlling the computing device to perform steps including accessing information about a network that is operable to perform a resolution flexible task and accessing an availability set each member of which is an alternative task performed deemed capable of performing a resolution flexible task in lieu of the task being performed by the network. Also, the tangible computer-readable medium stores instructions for controlling the computing device to perform the step of identifying, with respect to those alternative task performers in the availability set, a price qualified set each member of which is an alternative task performer: (a) whose price for performing the task complies with a price acceptability criteria or (b) that has a respective price proposal associated therewith reflecting a price for engaging the alternative task performer to perform the task in lieu of the task being performed by the network. The step of identifying a price qualified set includes evaluating selected operational relationships between assets of the network to determine the scope and extent of computing services that would need to be provided by each cloud service provider in the availability set in the event that the respective cloud service provider were to perform the network computing task in lieu of the task being performed by the network. The step of at least one of generating an output with a content about the price qualified set, whereby a display device can display a presentation based upon the transmitted content about the price qualified set, or initiating the performance of the task by an alternative task performer in the price qualified set.

Other aspects, embodiments and advantages of the present invention will becomes apparent from the following detailed description which, taken in conjunction with the accompanying drawings, illustrate the principles of the invention by way of example.

BRIEF DESCRIPTION OF THE DRAWINGS

The foregoing and other objects, features and advantages of the present invention, as well as the invention itself, will be more fully understood from the following description of various embodiments when read together with the accompanying drawings, in which.

DETAILED DESCRIPTION OF AN EMBODIMENT OF THE INVENTION

Figure 1:
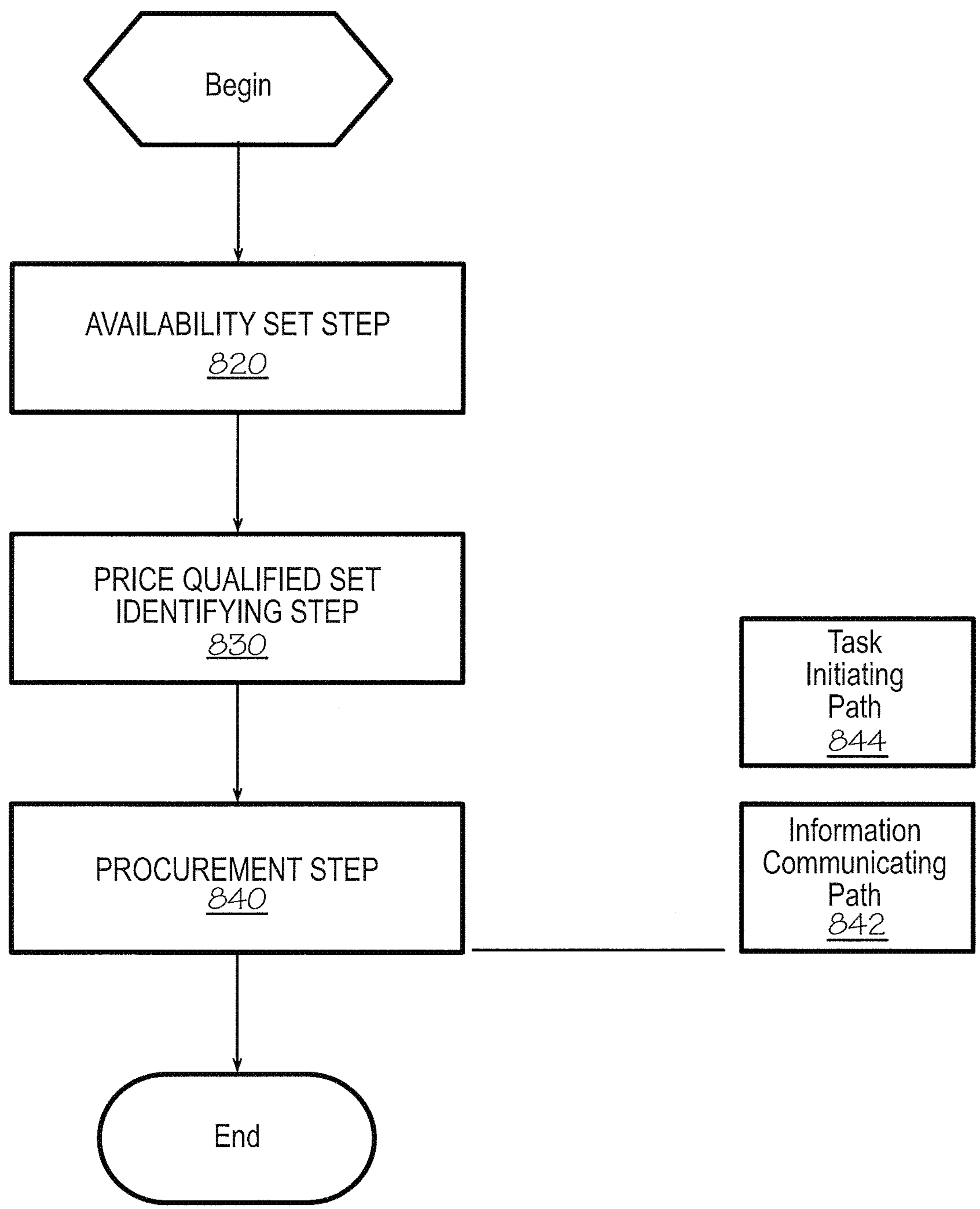
FIG. 1 is a schematic flow chart about the method for facilitating network external computing assistance of the present invention.

Reference is had to FIG. 1, which is a schematic flow chart about the method for facilitating network external computing assistance of the present invention can provide rapidly understandable and pertinent information for use by the network operator in making decisions about migrating computing tasks to an alternative task perform such as a private cloud computing resource or a public cloud computing resource. This method, hereinafter denominated as a method for facilitating external computing assistance, can provide a network operator with tools to guide decisions about migrating computing tasks to an alternative task performer such as a private cloud computing resource or a public cloud computing resource and tools for automatically effecting the migration of selected computing tasks to an alternative task performer.

"Cloud computing" refers to the access of computing resources and data via a network infrastructure, such as the internet. The computing resources and data storage may be provided by linked data centers of the "cloud,"—i.e., a "cloud" network. Each of the data centers may include a plurality of servers that provide computing resources, as well as data storage and retrieval capabilities. As used herein, "cloud service providers" refers to the owners or operators of the data centers that operate the "cloud" networks.

The method for facilitating network external computing assistance is particularly useful when executed as a method for providing pricing information about a potential migration of a network computing task. In accordance with this aspect of the method for facilitating network external computing assistance, the method includes the step of providing a provider availability set, identifying a price qualified set for each cloud service provider, and displaying the information about each cloud service provider and its pricing via a user interface. The provider availability set includes those cloud service providers who are deemed capable of performing the network computing task in lieu of the task being performed by the network. The price qualified set includes each cloud service provide: (a) whose price for performing the task complies with a price acceptability criteria or (b) that has a respective price proposal associated therewith reflecting a price for engaging the cloud service provider to perform the task in lieu of the task being performed by the network.

Figure 2:
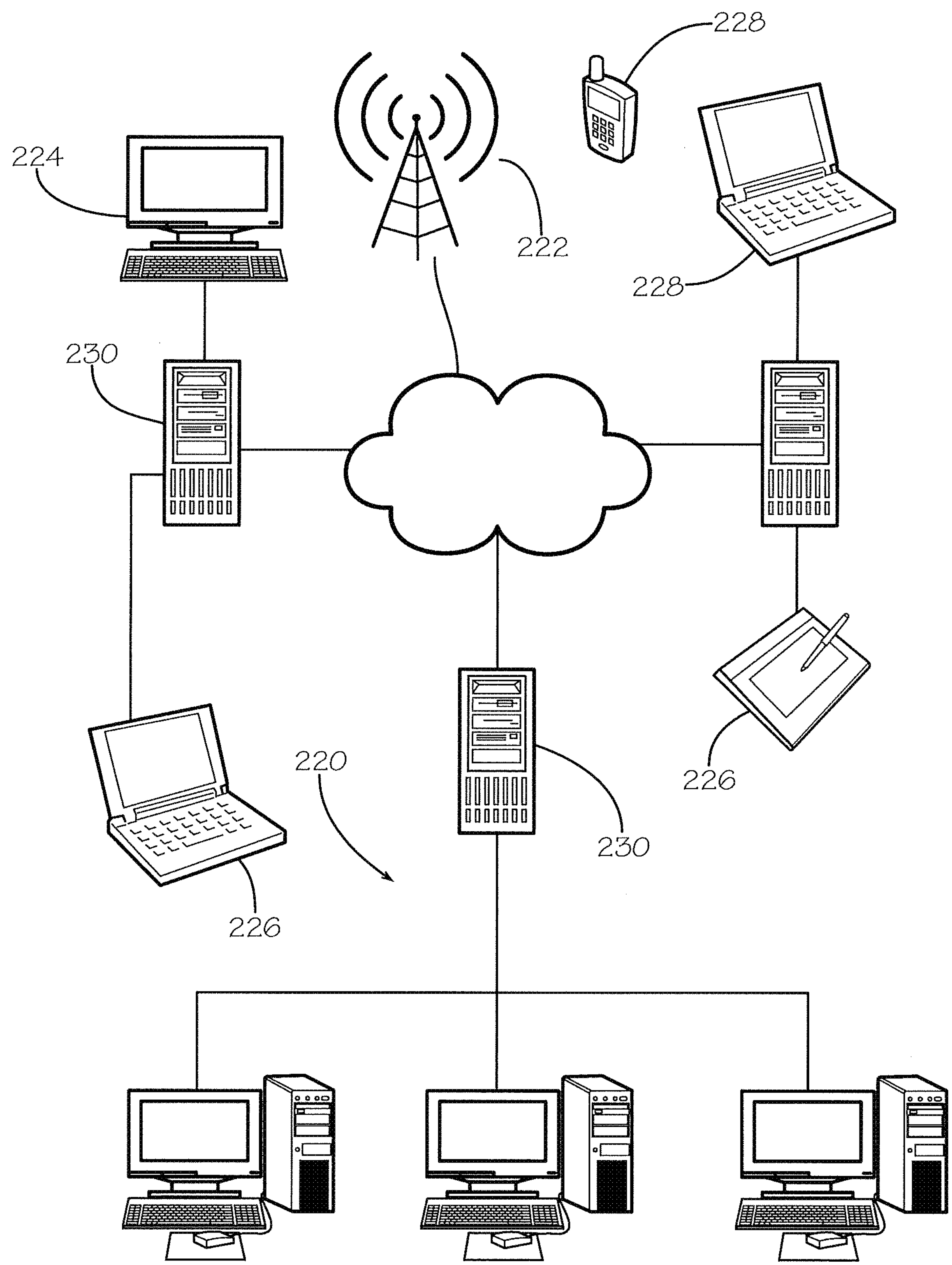
FIG. 2 is a schematic illustration of an exemplary network about which the method of the present invention can provide rapidly understandable and pertinent information for use by the network operator in making decisions about migrating computing tasks to an alternative task performer such as a private cloud computing resource or a public cloud computing resource.

The method for facilitating network external computing assistance is configured for use with a network and, as seen in FIG. 2, an exemplary network 220 is to be understood as representing any information technology or "IT" arrangement operable to store, manipulate, and present information to the network operator. As seen in FIG. 2, the exemplary network 220 can comprise components enabling the network to operate as a local area network, a wide area network such as the internet, and/or a wireless network operable to receive a wireless signal from a transmitter 222. The computers comprised by the network 220 may include desktop computers 224, laptop computers 226, hand-held computers 228 (including wireless devices such as wireless personal digital assistants (PDA) or mobile phones), or any other type of computational arrangement of hardware and/or software. The several computers may be connected to the network 220 via a server 230. It should be noted that any other type of hardware or software may be included in the system and be considered a component thereof.

Figure 3:
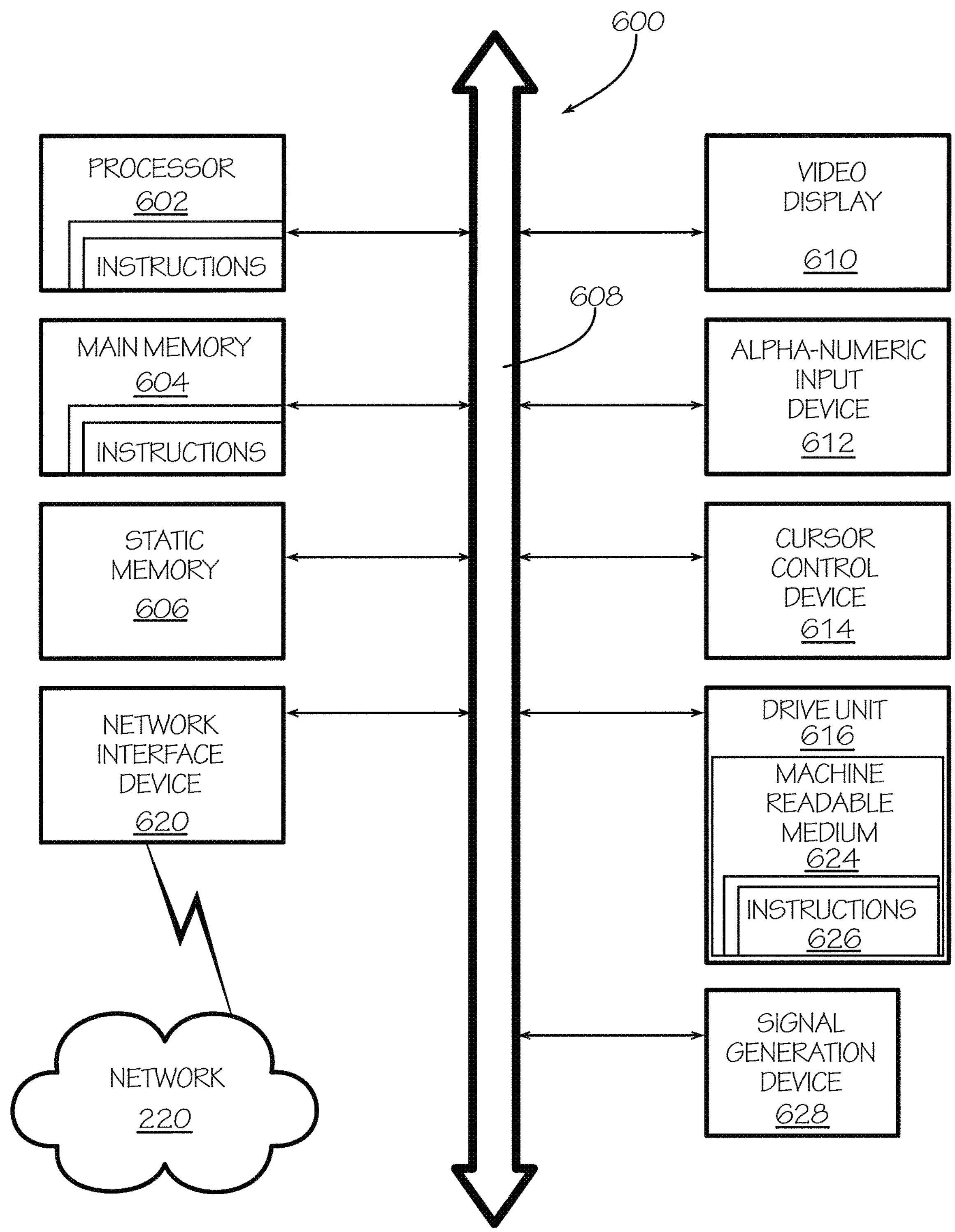
FIG. 3 is a schematic representation of a representative computer that is a piece of the exemplary network illustrated in FIG. 2.

It can thus be understood that the information technology "IT" arrangement exemplified by the network 220 comprises one or more computers in the general sense. In this connection, reference is had to FIG. 3, which is a schematic representation of a representative computer that is a piece of the exemplary network illustrated in FIG. 2 and it can be seen that a computer 600 includes a processor 602, a main memory 604 and a static memory 606, which communicate with each other via a bus 608. The computer 600 may further include a video display unit 610 (e.g., a liquid crystal display (LCD) or a cathode ray tube (CRT)). The computer 600 also includes an alphanumeric input device 612 (e.g., a keyboard), a cursor control device 614 (e.g., a mouse), a disk drive unit 616, a signal generation device 618 (e.g., a speaker), and a network interface device 620. The disk drive unit 616 includes a machine-readable medium 624 on which is stored a set of instructions implemented as software 626. The software 626 is also shown to reside, completely or at least partially, within the main memory 604 and/or within the processor 602. The software 626 may further be transmitted or received via the network interface device 620 and a signal generation device 628 is also provided. It is to be understood that any suitable embodiment of a computer may form a portion or the entirety of the network 220 in that a computer is to be regarded as a machine readable medium including any mechanisms for storing or transmitting information in a form readable by a machine. For example, a machine readable medium includes read-only memory (ROM); random access memory (RAM); magnetic disk storage media; optical storage media; flash memory devices, or any other type of media suitable for storing or transmitting information.

With reference to FIG. 1, which is a schematic flow chart about the method for facilitating network external computing assistant of the present invention, the method for facilitating network external computing assistance in one embodiment thereof is configured as a method for providing information about a network, wherein the network is a type of network operable to perform a resolution flexible task which is a task that could be performed via a given set of assets of the network or that could alternatively be performed via an alternative task performer external to the network. The method for facilitating network external computing assistance, hereinafter denominated as the network external facilitating method 810, includes the following core steps. As seen in FIG. 1, in an availability set step 820, an availability set is provided, each member of which is an alternative task performer deemed capable of performing a resolution flexible task in lieu of the task being performed by the network.

Figure 5:
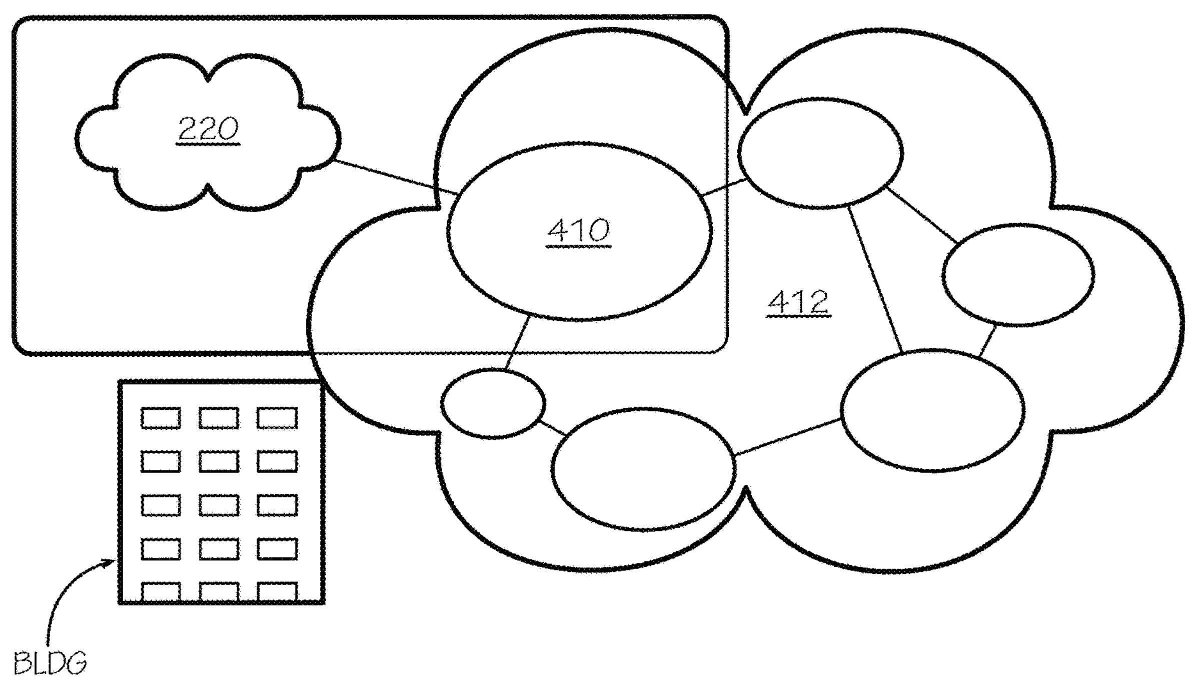
FIG. 5 is a schematic representation of different computing environments.

It is to be understood that each alternative task performer of the availability set may be a cloud computing resource. For example, as seen in FIG. 5, which is a schematic representation of different computing environments, the exemplary network 220 is shown as having its hardware assets located in a building BLDG, the cloud computing resource may be a private cloud computing resource 410 or a public cloud computing resource 412.

In a price qualified set identifying step 830, a price qualified set is identified with respect to those alternative task performers in the availability set, wherein each member of the price qualified set is an alternative task performer: (a) whose price for performing the task complies with a price acceptability criteria or (b) that has a respective price proposal associated therewith reflecting a price for engaging the alternative task performer to perform the task in lieu of the task being performed by the network. Once a price qualified set is established via the price qualified set identifying step 830, then a procurement step 840 is performed, wherein information about the price qualified set is communicated to the network operator via an information communicating path 842 or the performance of the task by an alternative task performer in the price qualified set is initiated via task initiating path 844, or both the activities of the information communicating path 842 and the task initiating path 844 are performed.

Some or all of the core steps of the method for facilitating network external computing assistance may be executed in accordance with further protocols in connection with the selected version of the method for facilitating network external computing assistance. For example, the availability set step 820, which provides an availability set, may include designating a collection of assets of the network as the given set of assets and deeming the resolution flexible task to be the cumulative computing operations that has been performed by the given set of assets of the network in accomplishing tasks within the network. Moreover, in accordance with one variation of the availability set step 820, the step includes deeming a set of assets less than the total assets of the network to be a first collection of assets of the network, deeming another set of assets less than the total assets of the network and comprising different a different set of assets than the first collection of assets of the network to be a second collection of assets of the network, and iteratively been performed by the first collection of assets of the network, designating the first collection of assets of the network to be the given set of assets of the network in accomplishing tasks within the network and generating a price qualified set based upon the first collection of assets of the network being designated as the given set of assets of the network, and deeming the resolution flexible task to be the cumulative computing operations that have been performed by the second collection of assets of the network, designating the second collection of assets of the network to be the given set of assets of the network in accomplishing tasks within the network, and generating a price qualified set based upon the second collection of assets of the network being designated as the given set of assets of the network, and providing information on the price qualified sets generated respectively based upon the first collection of assets of the network and based upon the second collection of assets of the network.

Figure 6:
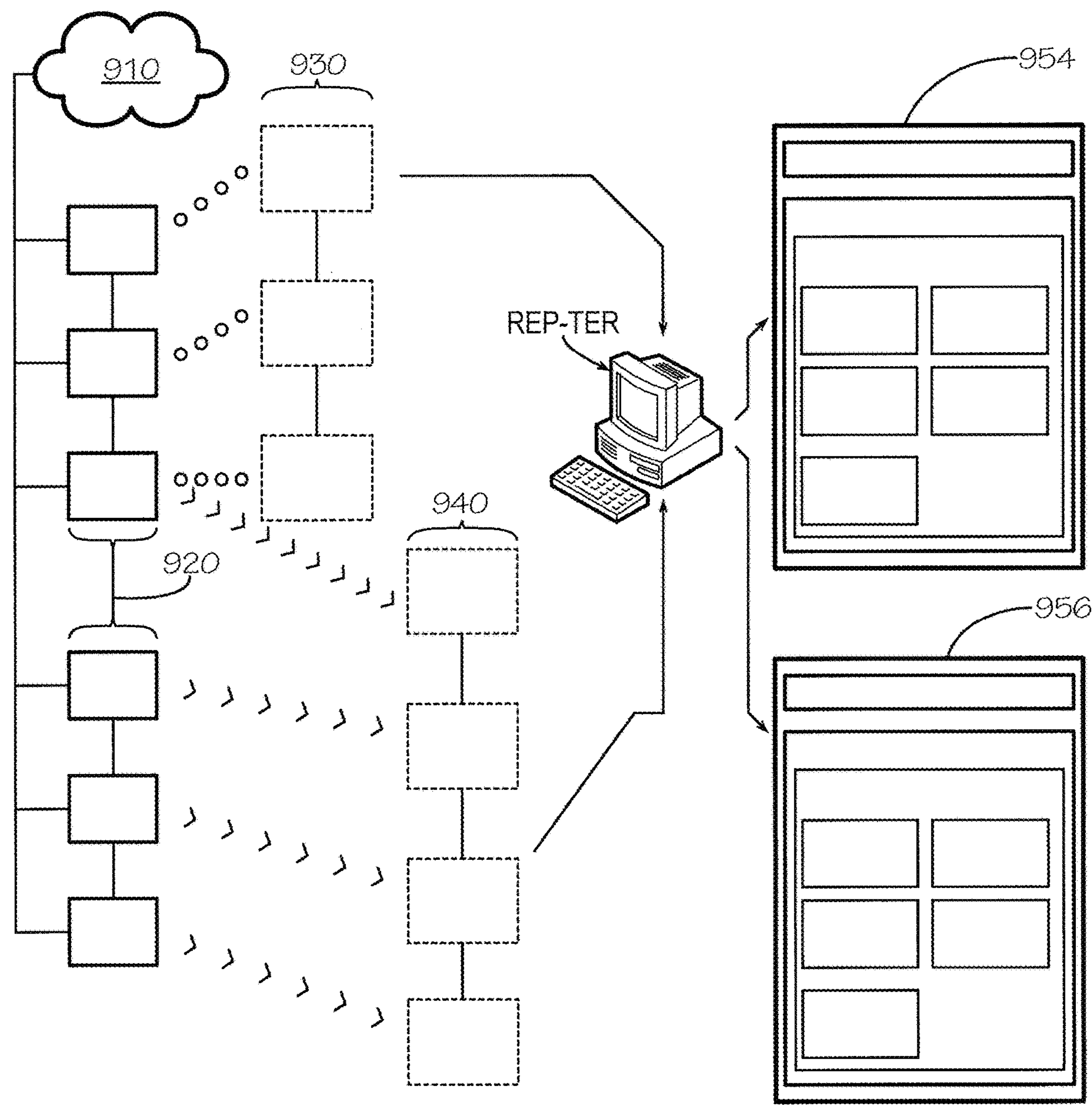
FIG. 6 is a schematic plan view of one variation of the availability set step of the method of the present invention.

Reference is had to FIG. 6, which is a schematic plan view of the one variation of the availability set step 820, for a more detailed explanation of the step refinement. As seen in FIG. 6, the total assets of a network 910 are designated as a full asset inventory 920 and the one variation of the availability set step 620 includes deeming a set of assets less than the total assets of the network to be a first collection of assets of the network 930, wherein, solely for illustration purposes, it can be seen that the first collection of assets of the network 930 is comprised of three arbitrarily designated asset subgroups. The one variation of the availability set step 820 further includes deeming another set of assets less than the total assets of the network and comprising a different set of assets than the first collection of assets of the network 930 to be a second collection of assets of the network 940, wherein, solely for illustration purposes, it can be seen that the second collection of assets of the network 940 is comprised of four arbitrarily designated asset sub-groups. The second collection of assets of the network 940 includes a single asset sub-group that is a member of both the first collection of assets of the network 930 and the second collection of assets of the network 940, although it is not mandatory that the second collection of assets to the network 940 include an asset sub-group that is a member of both the first collection of assets of the network 930 and the second collection of assets of the network 940.

A computer terminal REP-TER is shown in FIG. 6 to schematically illustrate the respective computing device that may be deployed to execute the steps of the methods of the present invention, including the one variation of the availability set step 820. With continuing reference to FIG. 6, the one variation of the availability set step 820 includes iteratively deeming the resolution flexible task to be the cumulative computing operations that have been performed by the first collection of assets of the network 930, designating the first collection of assets of the network 930 to be given set of assets of the network in accomplishing tasks within the network and generating a price qualified set based upon the first collection of assets of the network 930 being designated as the given set of assets of the network. As shown in broken lines in FIG. 6, the sub-step of generating a price qualified set based upon the first collection of assets of the network 930 being designated as the given set of assets of the network yields a price qualified set 954.

The one variation of the availability set step 820 additionally includes deeming the resolution flexible task to be the cumulative computing operations that have been performed by the second collection of assets of the network 940, designating the second collection of assets of the network 940 to be the given set of assets of the network in accomplishing tasks within the network, and generating a price qualified set based upon the second collection of assets of the network being designated as the given set of assets of the network. The sub-step of generating a price qualified set based upon the second collection of assets of the network 940 being designated as the given set of assets of the network yields a price qualified set 966.

The one variation of the availability set step 820 including providing information on the price qualified sets 956, 966 generated respectively based upon the first collection of assets of the network 930 and based upon the second collection of assets of the network 940.

In connection with the procurement step 840, in the event that information about the price qualified set is communicated to the network operator via the information communicating path 842, this can include communicating information about each alternative task performed in the price qualified set and its respective price proposal that reflects a price for engaging the alternative task performer to perform the task in lieu of the ask being performed by the network. For example, information about one or several cloud computing resources (i.e., alternative task performers) can be provided with a respective price proposal for each cloud computing resource that reflects a price for engaging this cloud computing resource to perform the task in lieu of the task being performed by the network.

One decision framework for deciding which collection of assets of the network are to be deemed as the given set of assets can be implemented via the approach of identifying a group of computing operations that are to be considered as suitable to be performed by a cloud service provider in lieu of being performed by the network and evaluating the assets of the network according to an evaluation criteria to determine if each such evaluated asset would be needed in the event that the network were to perform the identified group of computing operations. In this connection, the process of evaluating the assets of the network according to an evaluation criteria can include determining the existence of a dependency between an individual asset and another individual asset, wherein a dependency is deemed to exist if the cumulative computing operations performed by the given set of assets of the network could not be performed if the individual asset were not part of the given set of assets.

The method for facilitating network external computing assistance can be executed such that the availability set includes at least two alternative task performers—i.e., at least two cloud service providers—and such that the step of identifying a price qualified set 830 includes determining the respective price proposal of each alternative task performer of the availability set in compliance with a uniformly applied price work up protocol that is applied to all alternative task performers in the availability set. For example, in a given execution cycle of the method for facilitating network external computing assistance to provide a network operator with tools to guide decisions about migrating computing tasks to a cloud computing resource, the step of identifying a price qualified set 830 can generate a list of several cloud computing resources each with a respective price proposal that reflects a price for engaging the respective cloud computing resource to perform the resolution flexible task in lieu of the task being performed by the network and each price proposal can be generated via the application of a uniformly applied price work up protocol that is applied to all of the cloud service providers in the list. The uniformly applied price work up protocol may comprise, for example, determining the price proposal for each cloud service provider as a function of a stated or estimated cost per unit computing resource.

In further connection with the procurement step 830, this step can include displaying information about the price qualified set. Moreover, in the event that the price qualified sets 956, 966 have been generated respectively based upon the first collection of assets of the network 930 and based upon the second collection of assets of the network 940, then the procurement step 840 can include, for example, communicating a hierarchal listing of alternative task performers with the hierarchy being based upon a predetermined user preference criteria. Furthermore, this step of communicating a hierarchal listing of alternative task performers can include communicating the hierarchal listing in a manner which gives preference in the hierarchal listing among the enumerated alternative task performers to those alternative task performers who meet a sponsorship criteria.

An inventory and additionally, a cataloging via a classification system, of computer software and hardware assets of a network may be maintained manually or may be cyclically updated via an automated discovery tool, which is generally in the form of a combination of hardware and software that operates to automatically "discover" physical and virtual assets of a network and sort the same into a catalog. The computer software and hardware assets of a network are often grouped into logical groups that may be managed collectively, reducing the complexity and costs of managing those grouped assets. However, there is no common protocol for building and naming these logical groups of the computer software and hardware assets of a network. Network operators may create and populate logical groups with individual assets based on some organization-centric criteria or there may be defined groups that are automatically populated based on rules involving asset attributes.

Another approach to creating an inventory of computer software and hardware assets of a network and, additionally, creating a cataloging, of these computer software and hardware assets (organized into a classification system) involves examining the relationships between the nodes and the links of the network. These nodes include physical hosts, virtual machines, network devices, storage devices, and other nodes that provide a similar function. The network nodes are coupled for data communication flow via a data transmission medium which can be considered to be a link. The transmission medium could be wired, wireless, or some combination thereof. In fact, an examination of the relationships between the nodes and the links of a network can reveal a relationship between two or more nodes even where there is no direct architectural relationship between those nodes.

Figure 7:
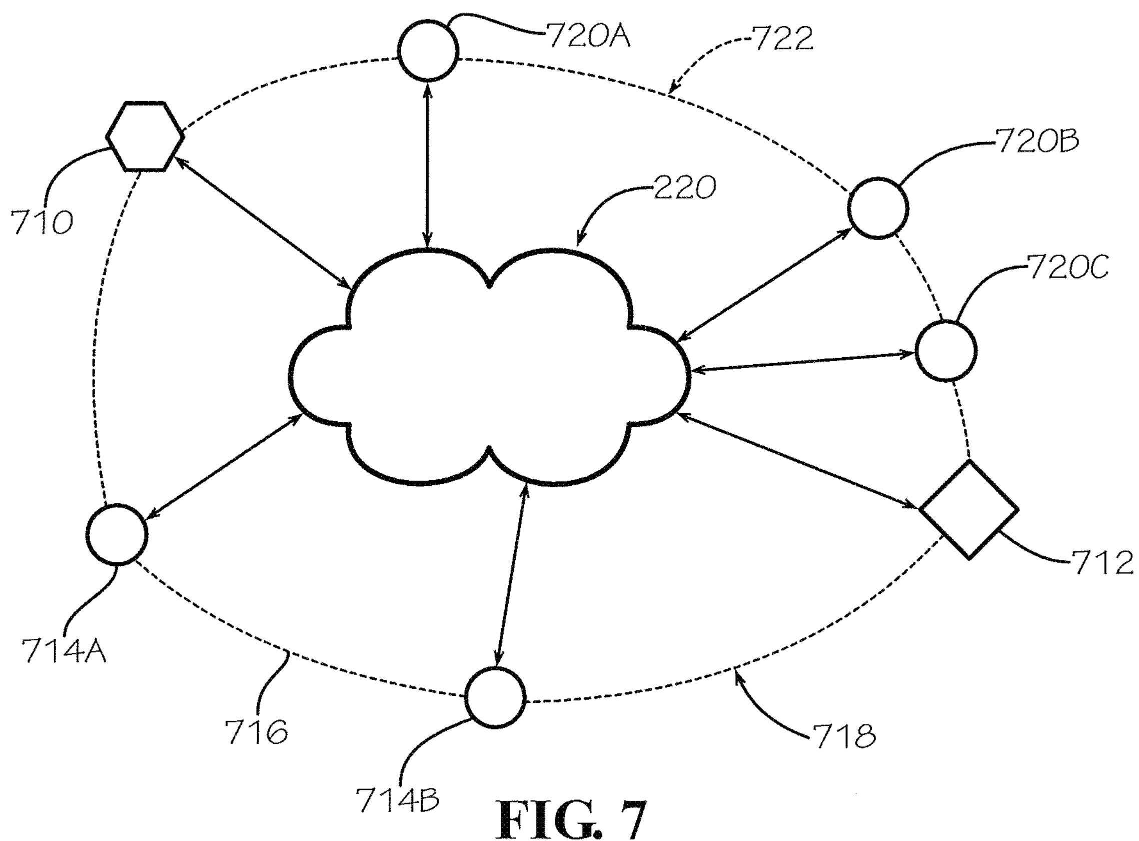
FIG. 7 is a schematic representation of a graphical diagram of a portion of a network as defined via its nodes and links.

FIG. 7 is a schematic diagram of a portion of a network as defined via its nodes and links and it can be seen that the selectively illustrated portion of the network 220 includes an initiator node 710, a destination node 712 and a plurality of intermediate nodes 714A and 714B connected via a plurality of links 716 defining a first path 718 and a plurality of intermediate nodes 720A and 720B, and 720C defining a second path 722. The term "node" is used to refer to a terminal point or an intersection point of a network. Depending on the level of abstraction, it may refer to a topology element such as a location in a network, a system, a piece of equipment or an individual component. Examples of node-type topology elements include: abstract elements such as locations and systems (such as a telephony exchange); physical elements such as a router, switch, terminal, hub, branch, intersection or the like; and virtual elements such as channels. The term "link" is used to refer to a topology element providing a connection between two nodes. A link is the abstraction of a transport infrastructure supporting connections between nodes. Link-type topology elements may include physical assets such as a signal conduit, a cable, or a connecting wire and may include non-tangible assets such as may be implemented via software such as a network link.

Figure 8:
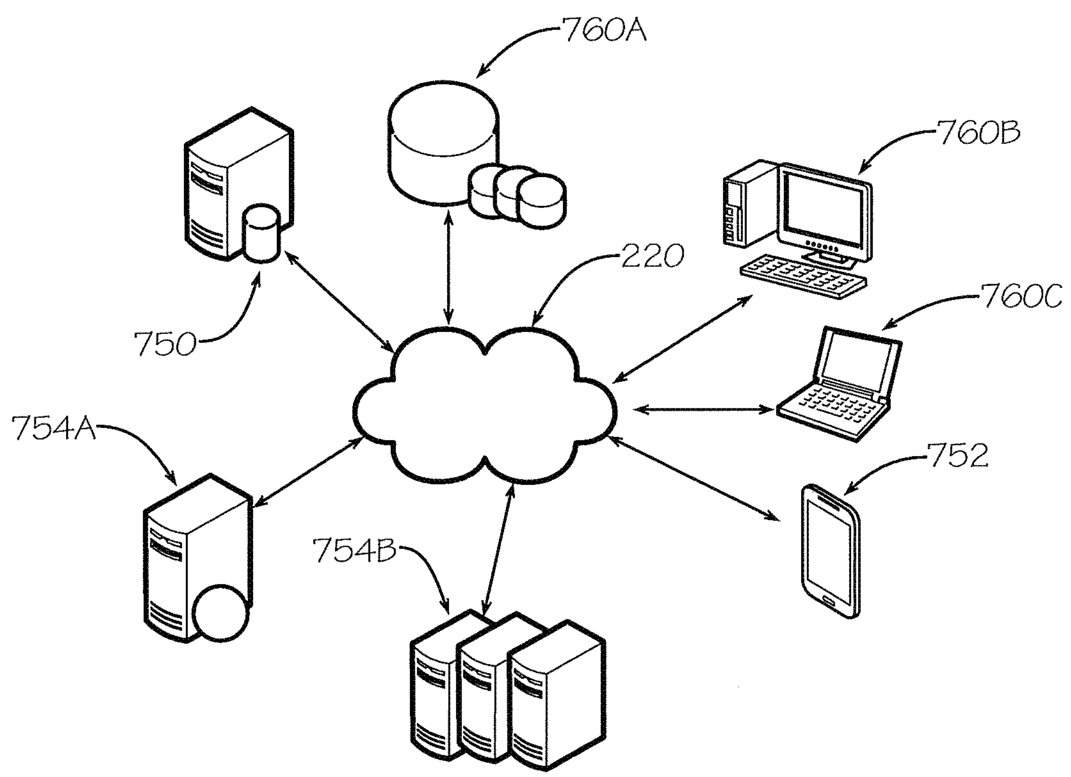
FIG. 8 is a schematic diagram of the portion of the network shown in FIG. 7 and showing exemplary node-type topology elements.

FIG. 8, which is a schematic diagram of the portion of the network shown in FIG. 7 and showing exemplary node-type topology elements, shows that the initiator node 710 may be a database server 750, the destination node 712 may be a hand held computing device 752, the intermediate node 714A may be a single server 754A, and the intermediate node 714B may be another server 754B connected via a plurality of links 716 defining the first path 718. Also, FIG. 8 shows that the intermediate node 720A may be a data storage arrangement 760A, the intermediate node 720B may be a desktop computer 760B, and the intermediate node 720C may be a laptop computer 760C connected via a plurality of links 716 defining the second path 722.

In the event that the procurement step 840 includes displaying information about a price qualified set, such information can be displayed in a format suitable for the network operator to, at the least, have a display of each alternative task performer in the price qualified set and its respective price proposal that reflects a price for engaging the alternative task performer to perform the task in lieu of the task being performed by the network. It is to be understood that the term "display" is used in a broad sense and encompasses all forms of communication in visual aural, and tactile format and including both human- and machine-interface variations.

The method for facilitating network external computing assistance of the present invention can be executed manually but is preferably executed via a tangible computer-readable medium for controlling a computing device to generate an output. This tangible computer-readable medium may be connected (e.g., networked) to other machines in a Local Area Network (LAN), an intranet, an extranet, or the Internet. The tangible computer-readable medium may operate in the capacity of a server or a client machine in a client-server network environment, or as a peer machine in a peer-to-peer (or distributed) network environment. The tangible computer-readable medium may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to execute the steps of the method of the present invention.

The user interface via which the price qualified set is accessible to a network operator may be configured as a stand-alone module that can be provided at no cost, at cost, or via leasing to network operations, wherein this stand-alone module may be configured to implement the method for facilitating network external computing assistance once operationally connected to a network. Alternatively, the user interface via which the price qualified set is accessible to a network operator may be configured and controlled by an intermediary agent which is figuratively between the network operators seeking migration guidance and the cloud service providers. The intermediary agent may configured the user interface and may provide the ancillary services that harvest the data to be handled during the implementation of the method for facilitating network external computing assistance, such as, for example, the network discovery services that identify and catalog the assets of the network. Additionally, the intermediary agent may solicit, coordinate, and structure the display artifacts via which information about the "sponsoring" and "non-sponsoring" cloud service provider is provided to the network operators. In this connection, the intermediary agent may solicit participation from potential "sponsoring" cloud service provider by negotiating or prescribing a price offering menu, for example, or the intermediary agent may conduct a binding process among potential "sponsoring" cloud service provider and aware successful bid presenters with preferred listing opportunities, guaranteed minimum number of listing presentations, etc.

Figure 4:
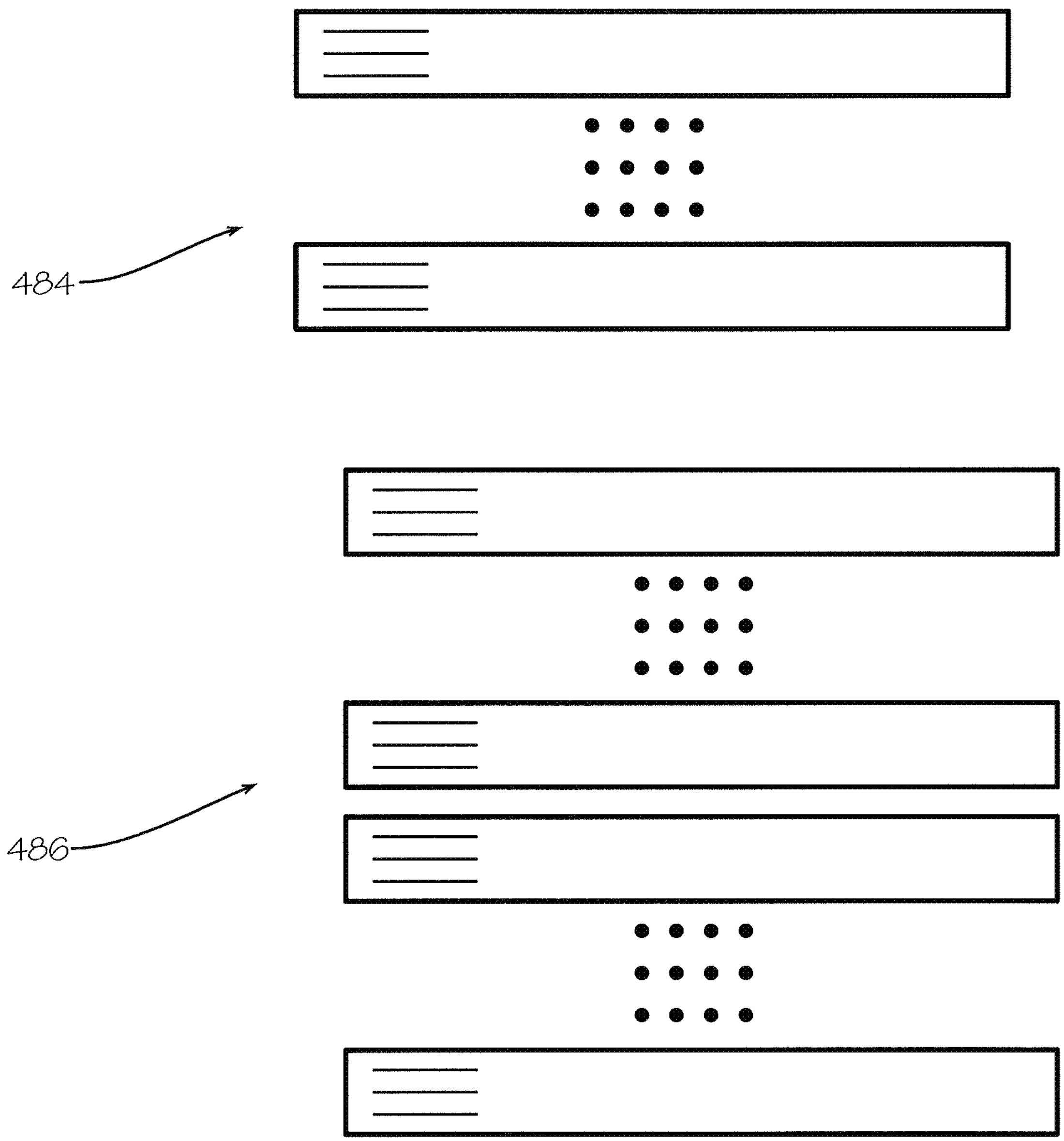
FIG. 4 is a schematic illustration of a display that may be configured on, and configured via, a dashboard platform for displaying information about the price qualified sets obtained via the method of the present invention.

As seen in FIG. 4, which is a schematic illustration of a display that may be configured on, and configured via, a dashboard platform for displaying information about the price qualified sets obtained via the method of the present invention, such a display may be configured on, and configured via, a dashboard platform 470 and the dashboard platform 470 may be configured to provide an intentionally ordered presentation of the alternative task performer or performers in the price qualified set with such presentation being communicated visually and/or aurally to the network operator. The intentionally ordered presentation of the alternative task performer or performers in the price qualified set may be arranged, for example, so as to provide the network operator with a hierarchal listing of the alternative task performer or performs in the price qualified set. As another example, the alternative task performer or performers in the price qualified set may be so arranged, for example, so as to provide the network operator with a hierarchal listing of the alternative task performer or performers in the price qualified set based upon directing the network operator to preferred resources that can help resolve metrics issues or capitalize upon identified opportunities. Further in this connection, the preferred resources can be comprised of vendors who have a particular capability such as, for example, cloud service providers having a particular capability, or vendors who are given preference relative to other vendors based upon a sponsorship criteria (i.e., “sponsoring” vendors are given a preferential showing the display provided by the dashboard platform 570 as opposed to “non-sponsoring” vendors).

The exemplary format displayed by the dashboard 470 in FIG. 4 includes a “banner”-type listing 484 comprising information about a “sponsoring” cloud service provider and this “banner”-type listing 484 is presented in a text and graphics format. The “banner”-type listing 484 is presented as the topmost one of a vertical listing of the cloud service providers in the price qualified set. For the purposes of illustration, it is assumed that the other cloud service providers 486 listed below the “banner”-type listing 484 are “non-sponsoring” cloud service providers. Information about the other cloud service providers 486 listed below the “banner”-type listing 484 are displayed in a text-only format or in another format selected to be less noticeable than the “banner”-type listing 484 comprising information about a “sponsoring” cloud service providers. Thus, by virtue of its topmost listing on the vertical listing of vendors and its more noticeable presentation in both text and graphics, as opposed to text alone, the “banner”-type listing 484 comprising information about a “sponsoring” cloud service providers is given a preferential showing in the display provided by the dashboard platform 470 as opposed to the “non-sponsored” cloud service providers 486. “Banner”-type listings may be comprised solely of graphic, graphics and text, or text only and may include, rich media (audio-video), promotions, or any feature that increases the value of listing to a vendor or a potential vendor willing to give value in return for a status as a “sponsoring” vendor.

In accordance with one variant for displaying the price qualified set, with particular application in the context of cloud service providers who agree to be “sponsoring” cloud service providers, cloud service providers may create and manage their listings through a user interface that permits the creation of one or more listing formats, the selection of details to associate with the listings, and an insert template that governs how and in which situations a listing will be displayed to a network operator. The cloud service provider may enter additional pieces of information and functionality pertaining to each listing. The cloud service provider may chose that a given listing be targeted only a discrete group of network operators, such as those meeting a set of customer demographics. Cloud service providers may set the specific price at which they are willing to offer their cloud services such as, for example, a single price or a price range for a “computing unit.” If desired, cloud service providers may have the ability to be apprised of the price offerings of other cloud service providers in order, for example, to ensure that their listing appears in a desired position or to optimize the “click-through” response or contact response of the listing.

A network asset may be embodied in a tangible form as a “hardware” element and can include physical devices such as a server, a router, or a peripheral device such as a scanner or a printer. Alternatively, a network asset may be embodied as a “software” element—i.e., a work station, a desktop computer, or a mobile telephony device that runs an operating program.

It is possible to characterize or describe the operational relationships between the hardware elements, the software elements, and the other elements of a network and the several types of operational relationships can be classified into categories of operational relationships. For example, a hardware configuration, a software configuration, or a usage configuration of a network asset may be seen as examples of operational relationship categories referred to as configurations. As another example, when considering an operational relationship between a given pair of network assets, if it is determined that one of the pair of network assets cannot perform its ascribed network function without the assistance of the other one of the pair of network assets, then this is an example of an operational relationship category referred to as a dependency.

The hardware configurations may be noted via various descriptors, such as, for example, a descriptor referring to a geographical or plant facility location where a network asset is housed or a descriptor referring to memory capacity of a given network asset. The software configurations may be noted via various descriptors, such as, for example, a descriptor referring to a given operating system or its modules, or a descriptor referring to the lag or non-lag status in the updating of the version of an operating system. The usage configurations may be noted via various descriptors, such as, for example, a descriptor referring to the times, frequencies, or types of input to a network asset or the times, frequencies, or types of outputs form a network asset. Another descriptor of a usage configuration may refer to claimed/unclaimed space of the network asset while a further descriptor may refer to physical space needs of a network asset or its energy use profile.

The process of identifying, and properly characterizing, the operational relationships between the hardware elements, the software elements, and the other elements of a network, is often termed as a “discovery” process and this discovery process can be performed manually or via the assistance of tailored discovery techniques including those using devices and software that automatically identify the operational relationships between the hardware elements, the software elements, and the other elements. Additionally, such discovery devices and software can be coupled with other devices or software that present the discovered information in a user-friendly format such as via a graphical user interface.

Information collected about the various operational relationships in a network can yield a picture about the performance of the network as a whole as well as a picture about the performance of all of the sub-groups of the network or selected sub-groups of the network. The network external facilitating method of the present invention can be executed to more accurately define the resolution flexible task that could be performed by an alternative task performer, such as a “cloud service perform” in lieu of the task being performed by the network. In this connection, one known or conventional approach to defining such resolution flexible tasks involves merely acquiring an inventory of the hardware and software network assets. Yet a network operator may not be able to rely on such an inventory listing of the hardware and software network assets to accurately or comprehensively identify those hardware and software network assets which will be released from the burden of performing a given resolution flexible task in the event that an alternative task performer, such as a “cloud service performer”, were to be chosen to perform the task in lieu of the task being performed by the network. To be sure, some assessment can be attempted to surmise which of the hardware and software network assets listed on an inventory listing of the hardware and software network assets will be impacted by shifting one or more or many tasks to an alternate task performer such as a cloud service performer. But a network operator typically does not have any worthwhile real knowledge, or modeled knowledge, of the sub-tasks performed by the hardware and software network assets in executing the resolution of the "replacement" resources that must be arranged if an alternate task performer such as a cloud service performer were to perform the tasks.

On the other hand, in accordance with the network external facilitating method of the present invention, the various operational relationships in the network are identified and this identifying information can provide a more accurate picture of those hardware and software network assets which will be released form the burden of performing the given resolution flexible task. Moreover, in accordance with the network external facilitating method of the present invention, the identifying information about the various operational relationships in the network is consolidated and evaluated in association with information about the alternate task performers, such as the cloud service performers, to arrive at the price qualified sets, such as the price qualified set 830 that has been described herein. A network operator can then be assured of a more realistic estimation of the "replacement" resources and can see and understand the respective price proposals of the alternative task performer that can provide the "replacement" resources.

Figure 9:
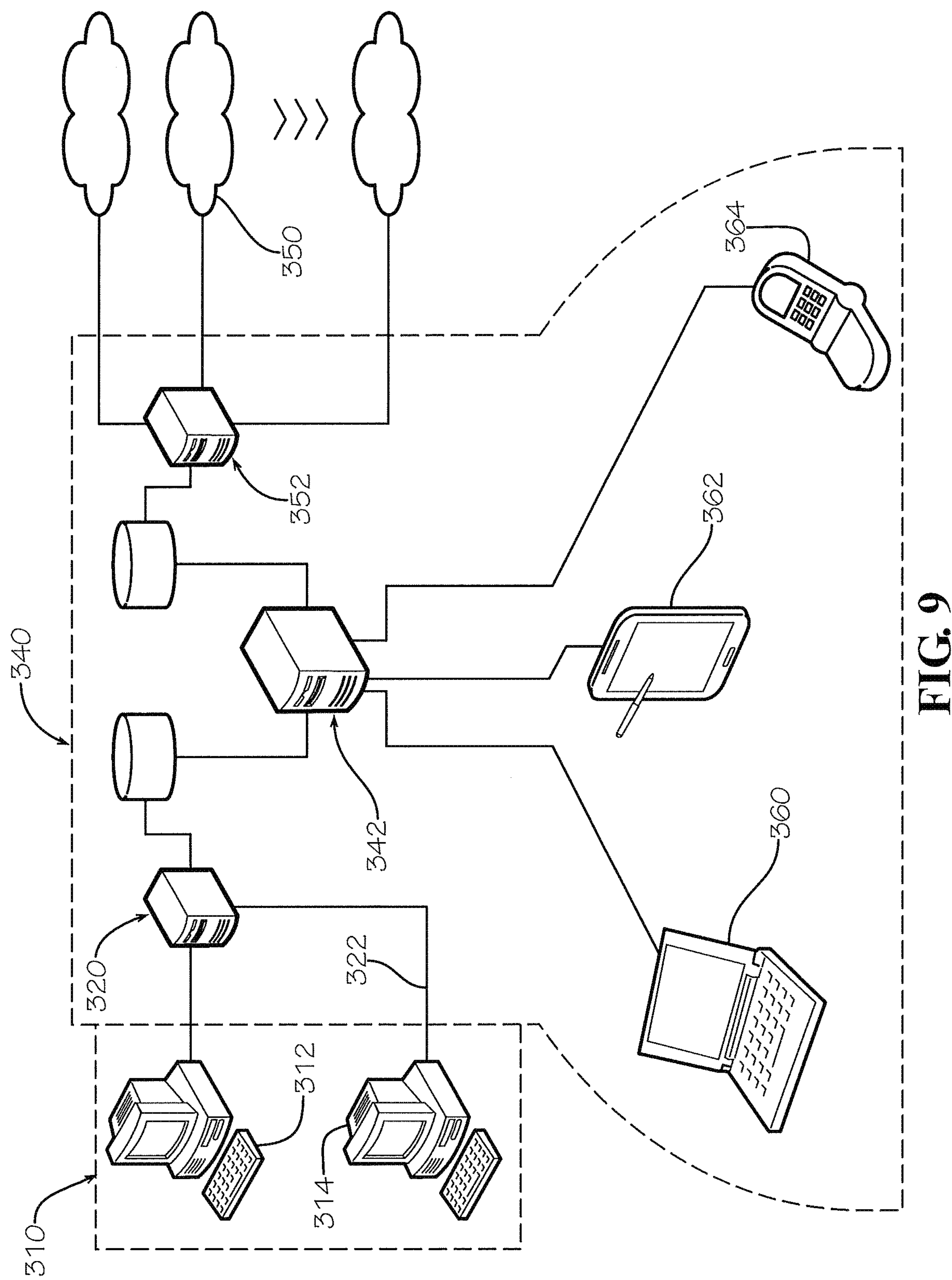
FIG. 9 is a schematic environmental view of the inputs relating to the various operational relationships in a network and the inputs about the alternate task performers evaluated by the method of the present invention and the outputs generated by the method in the form of price proposals of the alternative task performers that can provide services to the network operator.

FIG. 9 shows in a schematic environment view these inputs relating to the various operational relationships in the network, the inputs about the alternate task performers and the outputs generated by the method in the form of price proposals of the alternative task performers that can provide services to the network operator. A network 310, which can be, for example, the network 910 described with respect to FIG. 3, includes a collection of "hardware" elements and "software" elements such as representatively shown via a pair of desktop computers 312 and 314 that are each embodied as a "hardware" element (i.e., the "hardware" elements of an input device such as a keyboard and a display terminal) and a "software" element (an operating system) having an operational connection with the "hardware" elements. A discovery device 320 in the form of an automatic discovery device is operable to perform discovery of the assets of the network 310 (the control signals to control the discovery tasks and the transmission signals to transmit the discovered information are schematically designated via the links 322). The discovery device 320 can be controlled or operated by the network operator itself or by a third party discovery service provider. The third party discovery service provider may perform additional services in the role of an assessment intermediary that provides a full service package including a discovery deliverable and an enhanced decision deliverable or the assessment intermediary may obtain the discovery information from the network operator or a third party discovery service provider and then provide an enhanced decision deliverable to the network operator. As seen in FIG. 9, an assessment intermediary 340 is shown for illustration purposes that provides a full service package including a discovery deliverable and an enhanced decision deliverable.

The discovery tasks are specifically performed to yield identifying information about the various operational relationships in the network 310. Information about the alternate task performers, such as plurality of cloud service performers 350, is gathered before, during, and/or after the discovery of the assets of the network 310 and this vendor information is stored and handled via an appropriate arrangement such as, for example, a vendor list software program 352 operated by the assessment intermediary 340. Information about the cloud service performers 350 may include information about the input/output characteristics of these providers and may include information concerning the price or range of prices for performing a "standard" computing task.

Via a consolidation/evaluation program 342, which is schematically shown as a program performed by a remote server 342, the assessment intermediary 340 consolidates and evaluates the identifying information about the various operational relationships in the network 310 that has been received from the discovery device 320 and information about the cloud service performers 350 that has been curated by the vendor list software program 352. The consolidation/evaluation program 342 evaluates either the entirety of the hardware, software, and usage configurations of the network 310, or evaluates selected portions of the hardware, software, and usage configurations of the network 310, in accordance with any suitable evaluation protocol to yield an estimate of the hardware and software network assets that will be impacted in the event that one or more of the cloud service performers 350 were to be chosen to perform one or more resolution flexible tasks in lieu of the task or tasks being performed by the network and/or the manner in which such hardware and software network assets will be impacted. In addition, the consolidation/evaluation program 342 evaluates information about the cloud service performers 350 that has been obtained from vendor list software program 352 including, for example, information about the input/output characteristics of these providers and information concerning the price or range of prices for performing a "standard" computing task. In view of the fact that a given cloud service performer may define a "standard" computing task differently than other cloud service performers, the consolidation/evaluation program 342 may optionally be configured to normalize data received about these individual cloud service performer computing task prices so that a network operator can be presented with a clear picture for cost comparison purposes. The evaluation protocol can be embodied in proprietary methodology owned or controlled by the assessment intermediary 340 and can be configured to permit interaction by a network operator. For example, a network operator may be permitted to interact with the evaluation protocol executed by the consolidation/evaluation program 342 to vary the selection of the resolution flexible task or the resolution flexible tasks to be considered.

The price qualified sets 830 are conveniently rendered in graphical format and formatted for display on a device of the network operator such as, for example, a laptop 360, a table 362, or a mobile telephone 364. A network operator such as, for example, a laptop 360, a tablet 362, or a mobile telephone 364. A network operator can then be assured of a more realistic estimation of the "replacement" resources and can see and understand the respective price proposals of the alternative task performer that can provide the "replacement" resources.

Reference has been had herein to FIG. 7 for a description of how a network can be defined via its nodes and links. The method of the present invention makes use of discovery information that has been obtained concerning the assets of a network and, more particularly, discovery information concerning the hardware, software, and usage configurations of the network. Solely for the purpose of illustrating one approach for discovering the hardware, software, and usage configurations of the network, reference is now had to a description in U.S. Pat. No. 7,711,751 to Kelley et al. of a proposed approach for monitoring several links between a pair of switches in a network. The switches can be regarded as "nodes" within the network that are "linked" to one another via the links.

U.S. Pat. No. 7,711,751 to Kelley et al. discloses a method of collecting, recording, and normalizing network performance information and describes a monitoring approach via the use of probes. To assist in gaining an understanding this monitoring approach, the present application includes FIG. 10, which is a schematic view of a plurality of physical links that are established between the two switches in a computer network and which are schematically illustrated in FIG. 4B of U.S. Pat. No. 7,711,751 to Kelley et al. According to U.S. Pat. No. 7,711,751 to Kelly et al. in connection with its disclosed method of collecting, recording, and normalizing network performance, a monitoring of the links between the two switches in the computer network can be performed for the purpose of increasing the overall bandwidth available between the two switches. In analogous manner, such a monitoring approach can be undertaken in connection with the method of the present invention to obtain or discovery information about the hardware, software, and usage configurations, or to obtain or discover information about other operational relationships such as dependencies, relating to these two switches and the links between them. It can be understood that information about the hardware, software, and usage configurations, and other operational relationships such as dependencies, of the nodes and links of the remainder of the network can be obtained or discovered in analogous manner. Additionally, it can be understood that other discovery approaches are also suitable for use in executing the method of the present invention, including discovery approaches that do not make use of agents or probes.

Figure 10:
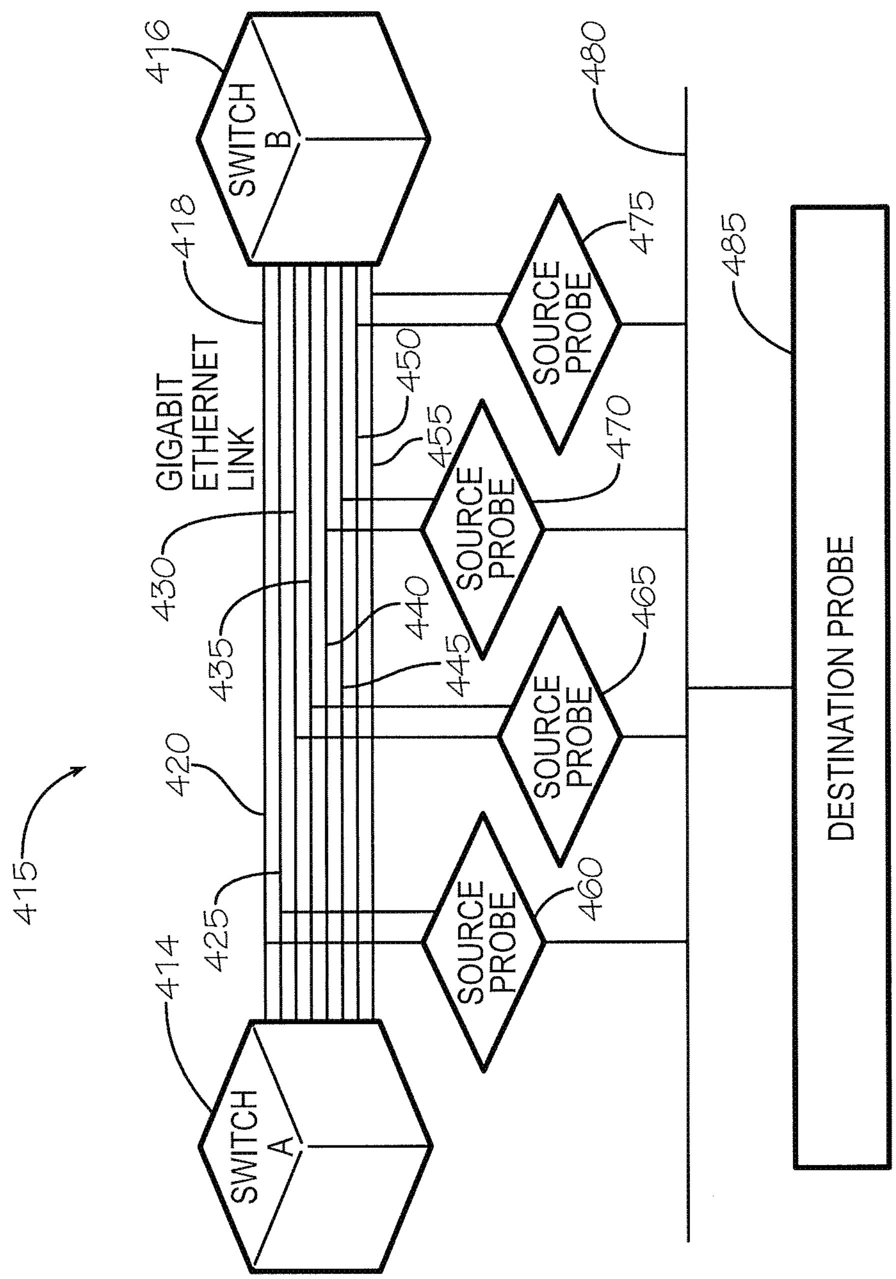
FIG. 10 is a schematic view of a plurality of physical links that are established between the two switches in a computer network.

According to U.S. Pat. No. 7,711,751 to Kelley et al., the two switches are linked by a total of eight physical links and these eight distinct physical links may be used as one logical link, with data from any particular application or source being sent across different physical links at any given time. Generally, the eight physical links are used to effectively increase the bandwidth between the two switches. According to U.S. Pat. No. 7,711,751 to Kelley et al., notes that an individual probe can monitor and report in the performance of one physical link, although in many cases it may be advantageous to monitor and report on the network performance at the logical link level—that is, across all eight of the physical links. As seen in FIG. 10, the two switches designated as the switch A, 414, and switch B, 416, are linked by eight separate gigabit Ethernet links, thereby establishing one logical link 415, between the two switches 414 and 416. Physical link 1, 420, and physical link 2, 425 are connected to a first source probe, 460 through its interfaces. Through these interfaces, the first source probe 460 monitors the performance of links 1 and 2, 420 and 425 respectively. Physical link 3, 430, and physical link 4, 435 are connected to a second source probe 465 through its interfaces. Through these interfaces, the second source probe, 465, monitors the performance of links 3 and 4, 430 and 435 respectively. Physical link 5, 440, and physical link 6, 445 are connected to a third source probe 470. The third source probe 470 monitors the performance of links 5 and 6, 440 and 445 respectively. Physical link 7, 450, and physical link 8, 455 are connected to a fourth source probe 475. The fourth source probe 475 monitors the performance of links 7 and 7, 450 and 455 respectively.

According to U.S. Pat. No. 7,711,751 to Kelley et al., each source probe collects data on the links to which it is connected, and relays the information via a network 480 to a destination probe 485. In some instances, the information may be relayed using alternative technologies such as wireless data transfer, optical data transfer, as well as others.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated by a computer system. It will be convenient at times, principally for reasons of common usage, to refer to the above-referenced signals as bits, values, elements, symbols, characters, terms, numbers or the like. It should be borne in mind, however, that all of these and similar terms are to be associated with the appropriate physical quantities and are merely convenient labels applied to these quantities.

Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Further, various embodiments of the present invention may be implemented with the aid of computer-implemented processes or methods (a.k.a. programs or routines) that may be rendered in any computer language including, without limitation, C #, C/C++, Fortran, COBOL, PASCAL, assembly language, markup languages (e.g., HTML, SGML, XML, VoXML), and the like, as well as object-oriented environments such as the Java object-oriented environment and the like. In general, however, all of the aforementioned terms as used herein are meant to encompass any series of logical steps performed in a sequence to accomplish a given purpose.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with teachings herein, or it may prove convenience to construct more specialized apparatus to perform the required method. For example, any of the methods according to the present invention can be implemented in hard-wired circuitry, by programming a general-purpose processor or by any combination of hardware and software.

One of ordinary skill in the art will immediately appreciate that the invention can be practiced with computer system configurations of any type, including hand-held devices, multiprocessor systems, microprocessor-based or programmable consumer electronics, DSP devices, network PCs, minicomputers, mainframe computers, personal computers, and the like. The invention can also be practiced in distributed computing environments where tasks are performed by remote processing devices that are linked through a communications network.

What is claimed is:

1. A computer-implemented method comprising:

determining, by an automated discovery system comprising one or more probe computing devices, computing services to be provided by a cloud service provider to perform at least one network computing task in lieu of a network performing the at least one network computing task;

identifying, by the automated discovery system, a plurality of cloud service providers for performing the at least one network computing task in lieu of the at least one network computing task being performed by the network;

determining, by the automated discovery system, dependencies between respective assets of the network performing the at least one network computing task, wherein a dependency between assets of a given set of assets of the network is determined based on determining that a computing operation performed by the given set of assets could not be performed if a particular asset were to be excluded from the given set of assets;

determining, by an intermediary system comprising one or more intermediary computing devices operating as an intermediary between the network and the plurality of cloud service providers, one or more computing resources of the plurality of cloud service providers required to perform the at least one network computing task;

generating, by the intermediary system, a visual representation of information regarding the plurality of cloud service providers based at least partly on respective capabilities of the plurality of cloud service providers;

causing, by the intermediary system, presentation of the visual representation via a user interface; and automatically migrating, by the intermediary system, the at least one network computing task from the network to a cloud service provider of the plurality of cloud service providers based at least partly on an interaction with the user interface.

2. The computer-implemented method of claim 1, wherein automatically migrating the at least one network computing task from the network to the cloud service provider causes a subset of computing resources of the cloud service provider to execute the at least one network computing task in lieu of a subset of computing resources of the network executing the at least one network computing task.

3. The computer-implemented method of claim 1, wherein generating the visual representation of information regarding the plurality of cloud service providers comprises determining a hierarchy level for individual cloud service providers of the plurality of cloud service providers based at least partly on the respective capabilities of the plurality of cloud service providers.

4. The computer-implemented method of claim 1, wherein generating the visual representation of information regarding the plurality of cloud service providers comprises generating graphical and textual content associated with a particular cloud service provider of the plurality of cloud service providers.

5. The computer-implemented method of claim 1, further comprising identifying a preferred cloud service provider of the plurality of cloud service providers based at least partly on the preferred cloud service provider being capable of resolving a metric issue.

6. The computer-implemented method of claim 1, wherein generating the visual representation of information regarding the plurality of cloud service providers comprises arranging display objects, corresponding to individual cloud service providers of the plurality of cloud service providers, within a hierarchical representation based at least partly on whether the individual cloud service providers are identified as preferred cloud service providers.

7. The computer-implemented method of claim 1, further comprising normalizing data, associated with individual cloud service providers of the plurality of cloud service providers, based at least partly on respective assets identified by the individual cloud service providers for performing the at least one network computing task.

8. The computer-implemented method of claim 1, further comprising generating, by the automated discovery system, monitoring data based at least partly on monitoring, using a probe computing device of the one or more probe computing devices, communications between assets of the network.

9. The computer-implemented method of claim 8, further comprising evaluating operational relationships between assets of the network based at least partly on the monitoring data.

10. A system comprising:

an automated discovery subsystem comprising one or more probe computing devices, wherein the automated discovery subsystem is configured to:

determine computing services to be provided by a cloud service provider to perform at least one network computing task in lieu of a network performing the at least one network computing task;

identify a plurality of cloud service providers for performing the at least one network computing task in lieu of the at least one network computing task being performed by the network; and determine dependencies between respective assets of the network performing the at least one network computing task, wherein a dependency between assets of a given set of assets of the network is determined based on determining that a computing operation performed by the given set of assets could not be performed if a particular asset were to be excluded from the given set of assets; and an intermediary subsystem comprising one or more intermediary computing devices operating as an intermediary between the network and the plurality of cloud service providers, wherein the intermediary subsystem is configured to:

determine one or more computing resources of the plurality of cloud service providers required to perform the at least one network computing task;

generate a visual representation of information regarding the plurality of cloud service providers based at least partly on respective capabilities of the plurality of cloud service providers;

cause display of the visual representation via a user interface; and automatically migrate the at least one network computing task from the network to a cloud service provider of the plurality of cloud service providers based at least partly on an interaction with the user interface.

11. The system of claim 10, wherein to automatically migrate the at least one network computing task from the network to the cloud service provider, the intermediary subsystem is configured to cause a subset of computing resources of the cloud service provider to execute the at least one network computing task in lieu of a subset of computing resources of the network executing the at least one network computing task.

12. The system of claim 10, wherein to generate the visual representation of information regarding the plurality of cloud service providers, the intermediary subsystem is configured to determine a hierarchy level for individual cloud service providers of the plurality of cloud service providers based at least partly on the respective capabilities of the plurality of cloud service providers.

13. The system of claim 10, wherein to generate the visual representation of information regarding the plurality of cloud service providers, the intermediary subsystem is configured to generate a first display object comprising graphical and textual content associated with a particular cloud service provider of the plurality of cloud service providers.

14. The system of claim 10, wherein the intermediary subsystem is further configured to identify a preferred cloud service provider of the plurality of cloud service providers based at least partly on the preferred cloud service provider being capable of resolving a metric issue.

15. The system of claim 10, wherein to generate the visual representation of information regarding the plurality of cloud service providers, the intermediary subsystem is configured to arrange display objects, corresponding to individual cloud service providers of the plurality of cloud service providers, within a hierarchical representation based at least partly on whether the individual cloud service providers are identified as preferred cloud service providers.

16. The system of claim 10, wherein the intermediary subsystem is further configured to normalize data, associated with individual cloud service providers of the plurality of cloud service providers, based at least partly on respective assets identified by the individual cloud service providers for performing the at least one network computing task.

17. The system of claim 10, wherein the automated discovery subsystem is further configured to generate monitoring data based at least partly on monitoring, using a probe computing device of the one or more probe computing devices, communications between assets of a network.

18. The system of claim 17, wherein the automated discovery subsystem is further configured to evaluate operational relationships between assets of the network based at least partly on the monitoring data.

* * * * *